United States Patent
Roybal

[11] Patent Number: 6,150,810
[45] Date of Patent: Nov. 21, 2000

[54] METHOD FOR DETECTING THE PRESENCE OF A FERROMAGNETIC OBJECT USING MAXIMUM AND MINIMUM MAGNETIC FIELD DATA

[75] Inventor: Lyle G. Roybal, Idaho Falls, Id.

[73] Assignee: Bechtel BWXT Idaho, LLC, Idaho Falls, Id.

[21] Appl. No.: 09/104,854

[22] Filed: Jun. 25, 1998

Related U.S. Application Data

[63] Continuation-in-part of application No. 08/823,268, Mar. 24, 1997, abandoned.
[51] Int. Cl.[7] .......................... G01R 33/02; G01R 33/04; G01B 7/00; G01V 3/08
[52] U.S. Cl. .......................... 324/244; 324/226; 324/227; 324/243; 324/253; 324/260; 340/551; 340/568.1; 702/150
[58] Field of Search ................ 324/207.26, 226, 324/227, 232, 239, 243, 247, 253–255, 260, 261, 326, 345; 340/551, 568.1; 702/150, 152

[56] References Cited

U.S. PATENT DOCUMENTS

| | | | |
|---|---|---|---|
| 3,781,664 | 12/1973 | Rorden | 324/247 |
| 3,971,983 | 7/1976 | Jaquet | 324/227 |
| 4,021,725 | 5/1977 | Kirkland | 324/326 |
| 4,068,164 | 1/1978 | Schwartz et al. | 324/253 X |
| 4,734,643 | 3/1988 | Bubenik et al. | 324/232 |
| 5,321,361 | 6/1994 | Goodman | 324/326 |
| 5,493,517 | 2/1996 | Frazier | 324/243 X |
| 5,504,428 | 4/1996 | Johnson | 324/243 |

*Primary Examiner*—Gerard Strecker
*Attorney, Agent, or Firm*—Klaas Law O'Meara & Malkin

[57] ABSTRACT

A method for detecting a presence or an absence of a ferromagnetic object within a sensing area may comprise the steps of sensing, during a sample time, a magnetic field adjacent the sensing area; producing surveillance data representative of the sensed magnetic field; determining an absolute value difference between a maximum datum and a minimum datum comprising the surveillance data; and determining whether the absolute value difference has a positive or negative sign. The absolute value difference and the corresponding positive or negative sign thereof forms a representative surveillance datum that is indicative of the presence or absence in the sensing area of the ferromagnetic material.

13 Claims, 11 Drawing Sheets

METHOD FOR DETECTING THE PRESENCE OF A FERROMAGNETIC OBJECT USING MAXIMUM AND MINIMUM MAGNETIC FIELD DATA

RELATED APPLICATION

This is a continuation-in-part of U.S. application Ser. No. 08/823,268 filed Mar. 24, 1997, now abandon which is incorporated herein by reference.

CONTRACTUAL ORIGIN OF THE INVENTION

The United States has rights in this invention pursuant to Contract No. DE-AC07-94ID13223 between the U.S. Department of Energy and Lockheed Martin Idaho Technologies Company.

FIELD OF INVENTION

This invention relates to metal detection apparatus in general and more specifically to a method and apparatus for detecting concealed weapons.

BACKGROUND OF THE INVENTION

Concealed weapons detection systems are used in a wide range of situations in order to provide added security against violent crimes. In addition to the well-known use of concealed weapons detection systems in public airports, such weapons detection systems are increasingly being used in court houses, schools and other public/governmental facilities that may be subject to threats or attacks by various members of the public.

One commonly used concealed weapons detection system is the electromagnetic (EM) induction system. Essentially, an EM induction system operates by periodically broadcasting an electromagnetic pulse or series of pulses, usually in the kilohertz range. It is believed that the transmitted electromagnetic pulse induces an electrical current or currents in electrically conductive objects contained within the sensing area. The induced electrical current or currents create their own electromagnetic signals which are then detected by a suitable detector associated with the weapons detection system.

While EM induction systems of the type described above have been used for decades as concealed weapons detection systems, they are not without their problems. For example, such EM induction systems are generally sensitive to the overall size, i.e., surface area of the object, not its mass. Consequently, small, compact, but massive objects, such as a small pistol, may not produce a "signature" that is significantly larger than the signature produced by a light weight object of the same size, such as keys or pocket change. Another problem associated with EM induction systems is related to the fact that EM systems are sensitive to electrically conductive objects, regardless of whether they are magnetic or non-magnetic. That is, EM systems tend to detect non-magnetic objects, such as pocket change, just as easily as magnetic objects (e.g., weapons). Consequently, EM systems tend to be prone to false alarms. In many circumstances, such false alarms need to be resolved by scanning the suspect with a hand-held detector in order to confirm or deny the presence of a dangerous weapon.

Accordingly, a need exists for an improved weapons detection system that reduces or eliminates some of the shortcomings and problems associated with conventional, EM-induction systems. For example, such an improved weapons system should have improved sensitivity and selectivity to reduce the occurrence of "false alarms," i.e., the detection of metals and materials that are not weapons. If the improvements in sensitivity and selectivity were significant, such an improved weapons detection system could be more safely monitored from a remote location. Indeed, several such systems could be monitored from the same location. The detection system or system could also be concealed, thereby reducing the number of circumvention attempts that are typically associated with more conspicuous detector systems. Additional advantages could be realized if such a system would be reliable and relatively inexpensive to implement and operate.

SUMMARY OF THE INVENTION

A method for detecting a presence or an absence of a ferromagnetic object within a sensing area may comprise the steps of sensing, during a sample time, a magnetic field adjacent the sensing area; producing surveillance data representative of the sensed magnetic field; determining an absolute value difference between a maximum datum and a minimum datum comprising the surveillance data; and determining whether the absolute value difference has a positive or negative sign. The absolute value difference and the corresponding positive or negative sign thereof forms a representative surveillance datum that is indicative of the presence or absence in the sensing area of the ferromagnetic material.

BRIEF DESCRIPTION OF THE DRAWINGS

Illustrative and presently preferred embodiments of the invention are shown in the accompanying drawings in which:

FIGS. 6A–F are graphical representations of magnetic field gradient vs. vertical position for an object having a dipole response characteristic;

DETAILED DESCRIPTION OF THE INVENTION

Figure 1:
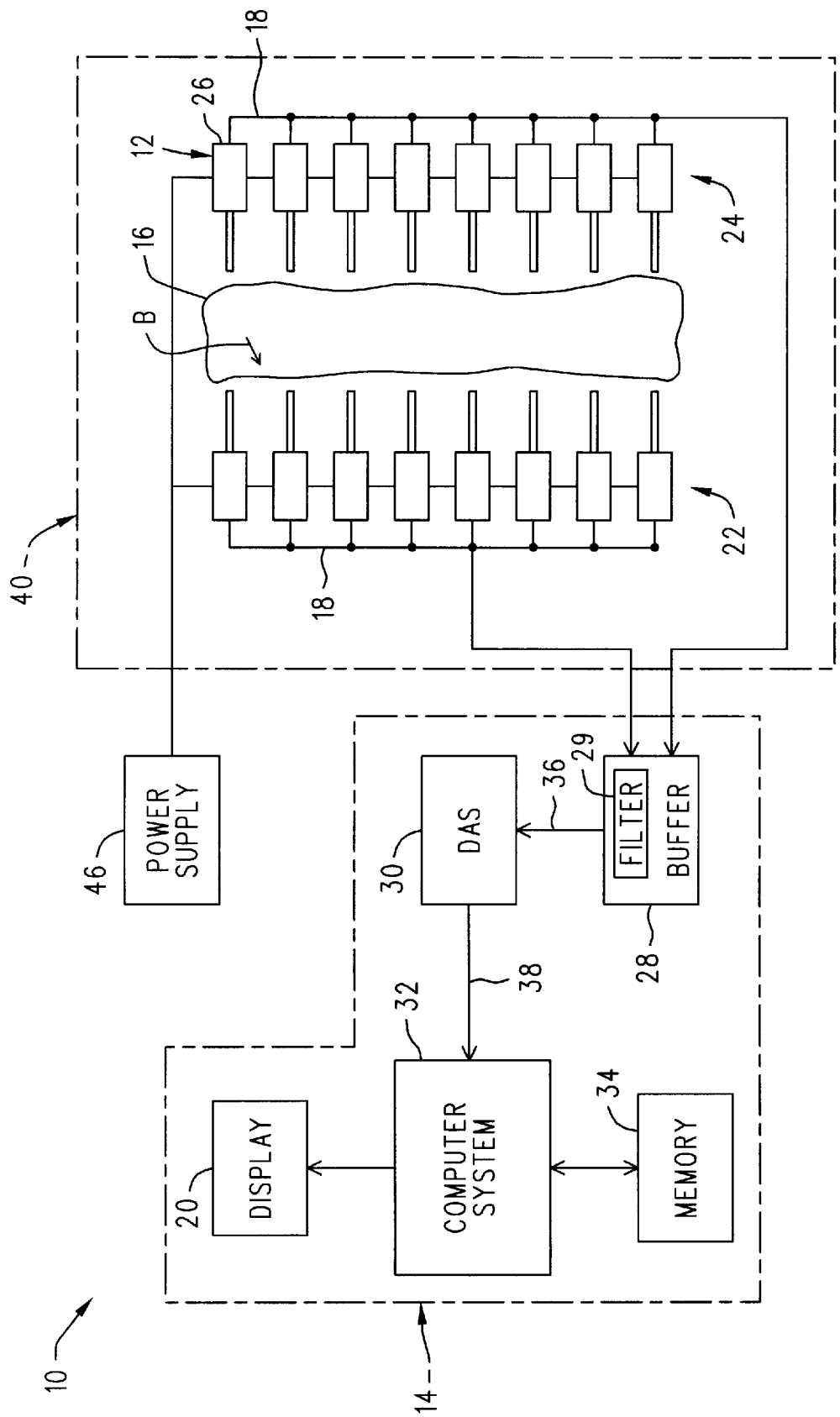
FIG. 1 is a block diagram of one embodiment of a system for detecting the presence of a ferromagnetic object according to the present invention showing the general arrangement of the sensor array and associated signal processing apparatus.

One embodiment of the advanced metal detection apparatus 10 according to the present invention is shown in FIG. 1 and may comprise a sensor array 40 connected to a signal processing system 14. The sensor array 40 may comprise a plurality of magnetic sensors or magnetometers 12, each of which is connected to a suitable power supply 46 and to the signal processing system 14. The sensors or magnetometers 12 sense changes or disturbances in an ambient magnetic field B (e.g., the earth's magnetic field) caused by the presence within the sensing area 16 of a ferromagnetic object or objects (not shown). Each magnetometer 12 produces an output signal 18 that is related to the detected changes in the magnetic field B. The signal processing system 14 analyzes the output signals 18 from the sensors or magnetometers 12 and produces a human readable display 20 indicative of the location of the detected ferromagnetic object or objects (not shown).

The magnetometers 12 that comprise the sensor array 40 may be arranged in any of a wide variety of configurations to define a sensing area 16 suitable for the detection of ferromagnetic objects (not shown) with the desired degree of sensitivity. For example, in the embodiments shown in FIGS. 1 and 2, the sensor array 40 may comprise a plurality of magnetometers 12 arranged in two generally vertically oriented rows; a first row 22 and a second row 24, with each magnetometer 12 in each row 22, 24 being generally evenly spaced from its neighbor. The rows 22, 24 are themselves aligned so that the magnetometers 12 are positioned in generally opposed, spaced-apart relation to one another, as best seen in FIG. 1. In the embodiment shown in FIG. 2, the two rows 22, 24 of magnetometers 12 are incorporated into a doorway 42 and define a sensing area 16 that encompasses the opening 44 of the doorway 42.

Figure 9:
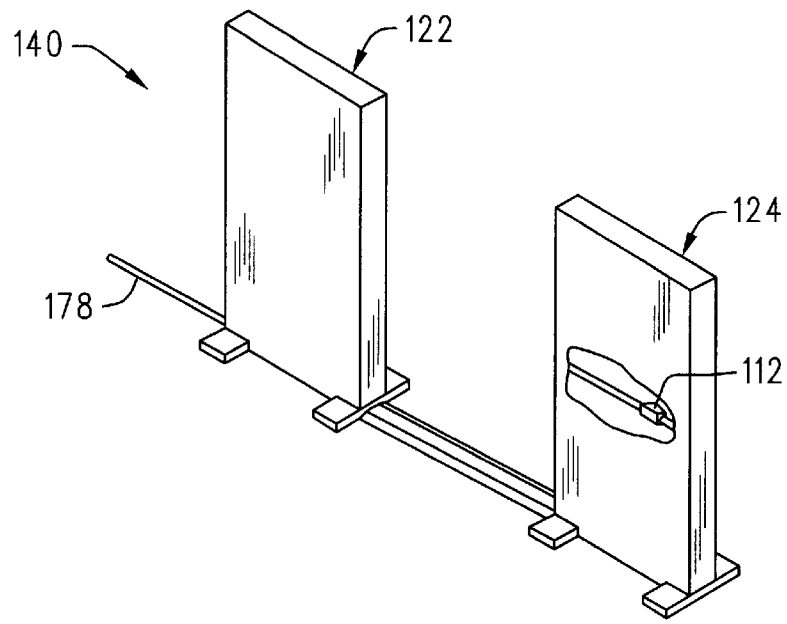
FIG. 9 is a perspective view of a portable sensor array with a portion of one of the panels broken away to show a magnetic sensor.
Figure 10:
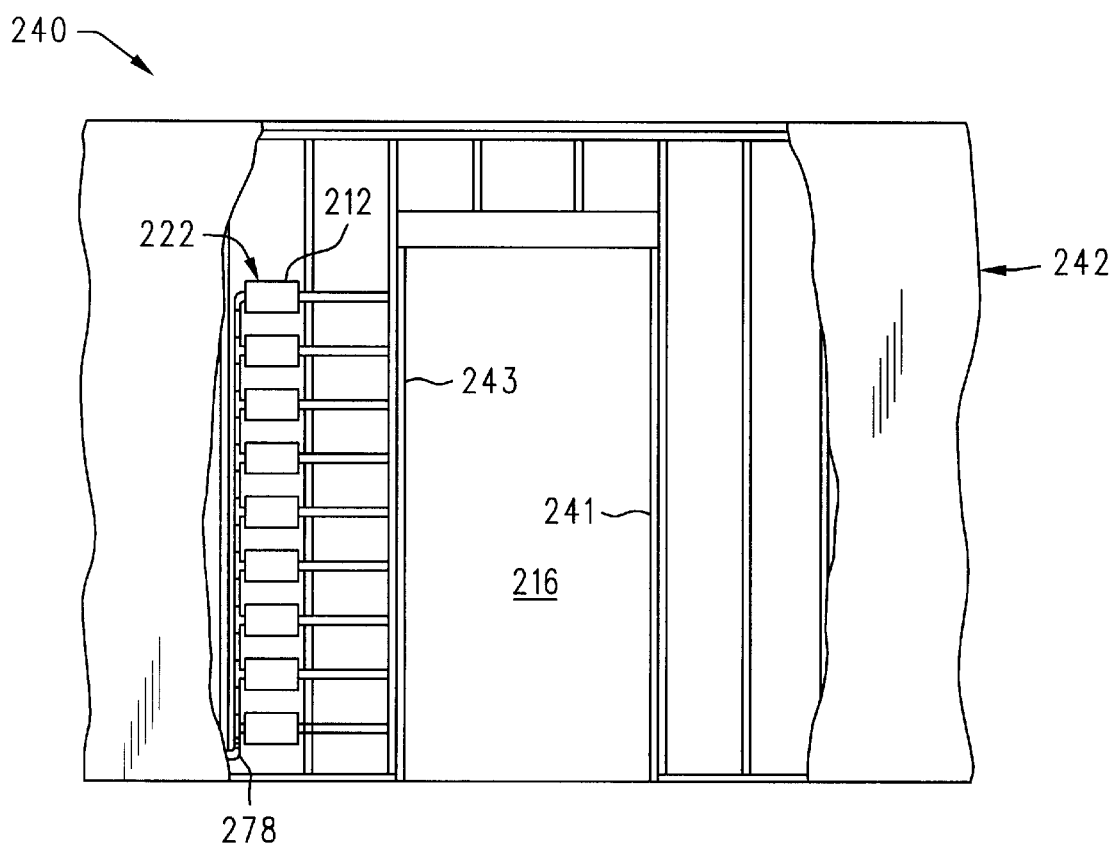
FIG. 10 is a front view in elevation of another embodiment of a doorway sensor array with a portion of the wall covering removed to show the position and orientation of the single row of magnetic sensors.

The sensor array 40 may take on other configurations. For example, the sensor array 40 need not be integrated into a doorway and may instead comprise a portable sensor array 140, as best seen in FIG. 9. Portable sensor array 140 is similar to the sensor array 40 and may comprise two free-standing panels 122, 124 positioned in opposed, spaced-apart relation. Each of the panels 122, 124 houses a plurality of magnetometers 112, generally in the spaced-apart, opposed arrangement shown in FIGS. 1 and 2. Still another embodiment of the sensor array 240 is shown in FIG. 10 and may comprise a single row 222 of sensors 212 incorporated into a doorway 242. In yet another arrangement, the sensor array 340 may comprise a horizontally oriented sensor array 340 that comprises a plurality of sensors 312 arranged along an upper row 322 and a lower row 324 positioned above and below a doorway 342. See FIG. 11.

Regardless of the particular configuration of the sensor array 40, the magnetometers 12 are sensitive to disturbances in the magnetic field B that may be caused by the presence within the sensing area 16 of a ferromagnetic object or objects (not shown). Actually, the magnetometers 12 only detect those portions of the magnetic field B that actually impinge the magnetometers 12, but most ferromagnetic objects of substantial mass and located within the sensing area 16 will disturb the magnetic field B to a sufficient degree so that the disturbance will be detected by at least one of the magnetometers 12.

The magnetometers 12 may comprise any of a wide range of devices for detecting changes in magnetic fields, as will be described in greater detail below. In one preferred embodiment, the magnetometers 12 may comprise fluxgate gradiometers 26 (FIG. 3) which, due to the horizontal orientation of their sensing rods 64, sense changes in the horizontal gradient of the magnetic field B.

The signal processing system 14 is connected to the plurality of magnetometers 12 and is sensitive to the output signals 18 produced by the magnetometers 12. The signal processing system 14 processes the output signals 18 and produces a human-readable output on the display 20. In one embodiment, the human-readable output on the display 20 may comprise a graphical representation of magnetic field gradient vs. vertical position, as shown in FIGS. 6A–F. Alternatively, the human-readable output on the display 20 may provide a pictorial representation of the sensing area 16 with the probable location or locations of the detected ferromagnetic object or objects indicated by highlights 96. See FIG. 8.

The signal processing system 14 may include a buffer system 28, a filter system 29, a data acquisition system (DAS) 30, and a computer system 32. The computer system 32 may also include a memory system 34 and a display system 20. The buffer system 28 is connected to each of the magnetometers 12 and serves as an impedance matching device to more closely match the output impedance of the magnetometers 12 with the input impedance of the data acquisition system (DAS) 30. The buffer system 28 receives the output signals 18 generated by the magnetometers 12 and produces a series of analog output signals 36 that are received by the data acquisition system 30.

In one preferred embodiment, the buffer system 28 may include a suitable electronic noise filter system 29 to remove ambient magnetic "noise" of a periodic nature, e.g., the 50 or 60 Hz magnetic fields created by a.c. power systems. Alternatively, the signal processing system can remove or "filter" such periodic magnetic noise signals by utilizing an "over-sampling" technique that will be described in greater detail below.

The data acquisition system (DAS) 30 may comprise one or more analog-to-digital (A/D) converter(s) (not shown) to convert the analog signals 36 received from the buffer 28 into digital signals 38 suitable for use by the computer system 32. The data acquisition system 30 may also be programmed to scan or sample the analog data 36 from the buffer system 28 (i.e., the output signals 18 from the magnetometers 12) at specific sample rates and at specific sample intervals, a process referred to herein as a "scanning function." Accordingly, then, the digital signals 38 produced by the data acquisition system represent a large number of brief "snap-shots" of the output signals 18 from the magnetometers 12.

The computer system 32 receives the digital signals 38 from the data acquisition system (DAS) 30, processes the data signals 38, and ultimately produces a human-readable display 20 of the magnetic field data obtained from the sensors array 40. In one embodiment, the human-readable display 20 may comprise a graphical representation of the magnetic field gradient $\nabla$ vs. vertical position. See, for example, FIGS. 6A–F. Another type of human-readable display 20 may comprise a pictorial representation of the sensing area 16 with the probable locations and relative sizes of the detected ferromagnetic objects indicated by highlights 96. See FIG. 8.

Figure 4:
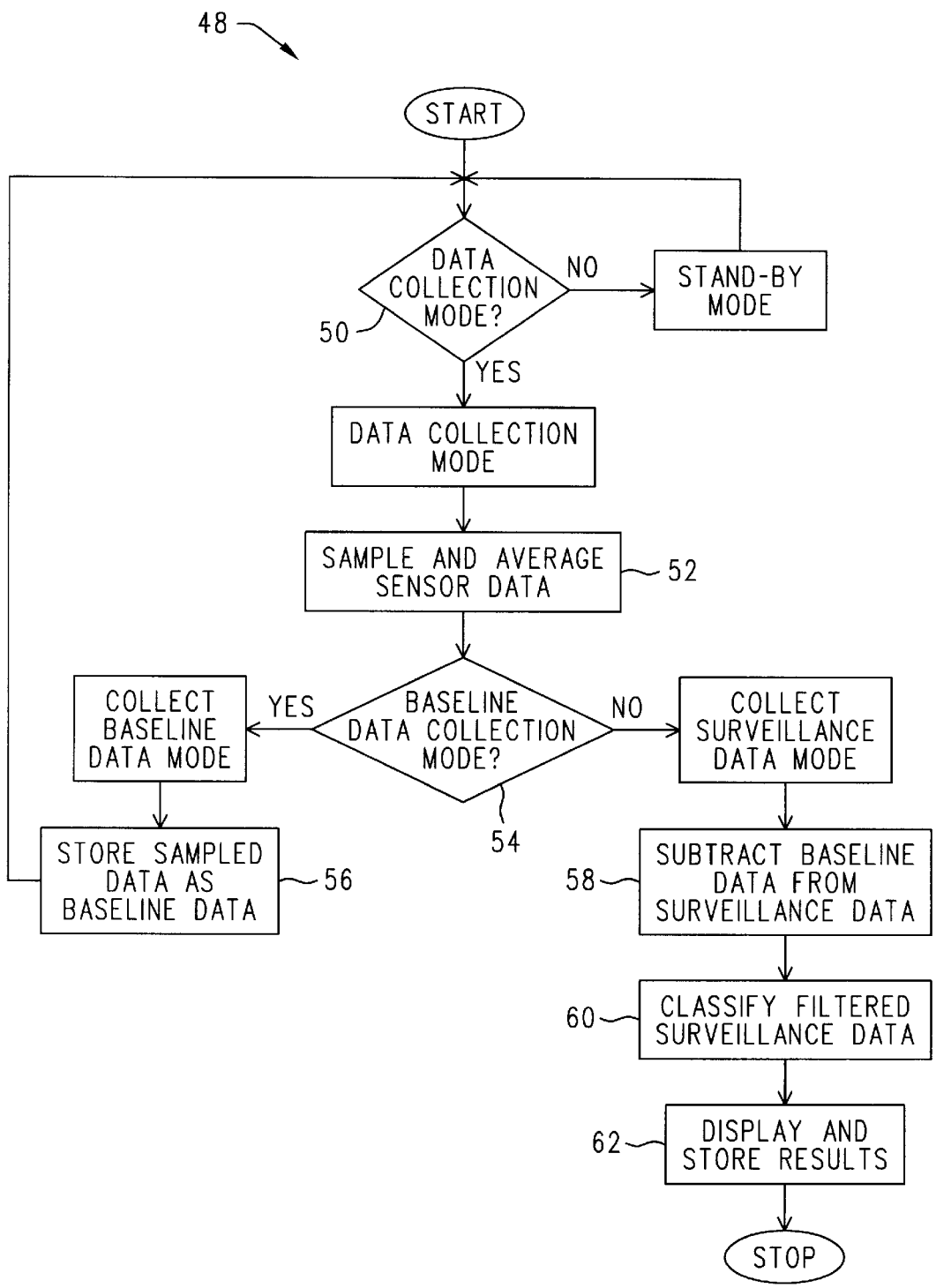
FIG. 4 is a flow diagram showing the data collection and classification process steps performed by the signal processing apparatus shown in FIG. 1.

The computer system 32 implements a data collection and classification process 48 in order to produce the human-readable display 20. Referring now specifically to FIG. 4, the first step in the data collection and classification process 48 is to determine whether the signal processing system 14 is being operated in either a "stand-by" mode or a "data collection" mode. If the signal processing system 14 is being operated in the "stand-by" mode, no data will be collected and the system 14 will continue to repeat step 50 until the computer system 32 receives a command to enter the "data collection" mode. Once such a command is received, the system 14 will switch to the "data collection" mode and proceed to step 52. At this point, the system 14 may be operated in one of two "data collection" modes: A "baseline data collection" mode or a "surveillance data collection" mode.

The "baseline data collection" mode (steps 54 and 56) is used to collect "baseline data." Essentially, the "baseline data" are representative of the ambient magnetic field B, i.e., when no ferromagnetic objects are located in the sensing area 16. When the system 14 is operated in the "baseline data collection" mode, data from the magnetometers 12 is collected, averaged, and stored as "baseline data." Generally speaking, if the detection apparatus 10 is being operated for the first time or if it is being operated at a new site or location, it will usually be desirable to first operate the system 14 in the "baseline data collection" mode. Alternatively, the system 14 may be operated in the "baseline data collection" mode at periodic intervals (e.g., every ten (10) minutes or so) to ensure that the "baseline data" more accurately reflect the current characteristics of the ambient magnetic field B.

Once the "baseline data" have been collected and stored, the system 14 may be operated in the normal or "surveillance data collection" mode (steps 54–62). In the normal or "surveillance data collection mode," the output data signals 18 from the magnetometers 12 are sampled by the data acquisition system 30 and fed into the computer system 32. These data are referred to herein as "surveillance data." The "surveillance data" may then be processed to determine whether ferromagnetic objects (not shown) are present within the sensing area 16.

As a first step 58 in processing the "surveillance data," the computer system 32 first subtracts the "baseline data" from the "surveillance data" to produce "nulled" or "filtered surveillance data," i.e., data from which the signature of the ambient magnetic field B has been removed. The computer system 32 may then display the "nulled" or "filtered surveillance data" on the display 20. In one preferred embodiment, the "nulled" or "filtered surveillance data" may be displayed in the form of magnetic field gradient $\nabla$ vs. vertical position, as best seen in FIGS. 6A–F.

In another embodiment, the computer system 32 may further examine the "nulled" or "filtered surveillance data" in step 60 to determine whether any magnetic anomalies are present that might be indicative of the presence of a ferromagnetic object within the sensing area 16. The resulting data are referred to herein as "classified data." The computer system 32 then performs step 62 to display the "classified data" on the display system 20 in a convenient human readable form. See FIG. 8. Depending on the degree of analysis performed by the computer system 32, the computer system 32 also may be programmed to actuate a visual or aural alarm upon the detection of a predetermined quantity of ferromagnetic material, i.e., material which may be indicative of the presence of a weapon. Alternatively, the display 20 could flash a warning signal 95, so that the operator (not shown) could take appropriate security measures.

A significant advantage of the advanced metal detection apparatus 10 according to the present invention is that it is generally more discriminating than conventional EM induction detectors. That is, since the metal detector 10 is generally sensitive to ferromagnetic materials while being generally insensitive to non-ferromagnetic materials, the system 10 significantly reduces the frequency of false alarms that may be caused by the detection of non-ferromagnetic materials, such as pocket change, keys, jewelry, etc. When an alarm condition is detected, it is usually the result of the detection of a threshold mass (and a corresponding suspicious location) of ferromagnetic material. Therefore, the present invention substantially increases the chances that the detected object is, indeed, of relevance.

The greater discrimination associated with the metal detector 10 of the present invention could allow several detectors to be monitored from a single station, thereby reducing the number of attendants required to monitor the system and generally lowering operating costs. Another advantage of the invention is that it can be readily concealed within a wall or doorway. Consequently, if no attendants are present at or near the actual detector location, the system may be less prone to circumvention attempts since persons will not be aware that they are under surveillance by the detection system 10.

Still other advantages are associated with the invention. For example, the fluxgate gradiometers 26 that may be used as the sensing magnetometers 12 are relatively inexpensive and reliable, thereby reducing overall cost of the detection system and reducing the down-time that may be required for repairs. The signal processing system 14, being based on a general purpose programmable computer, can be readily programmed to present the data in any of a wide-range of human-readable forms. Improved detection or display capabilities can also be readily incorporated into the detector apparatus 10 by simply re-programming the computer system 32.

Having briefly described the advanced metal detection apparatus 10 according to the present invention, as well as some of its more significant features and advantages, the various embodiments of the advanced metal detection apparatus will now be described in detail.

Referring back now to FIG. 1, one embodiment of the advanced metal detection apparatus 10 may comprise a sensor array 40 that is connected to a signal processing system 14. The sensor array 40 may comprise a plurality of magnetic sensors or magnetometers 12 that are sensitive to changes produced in an ambient magnetic field B (e.g., the earth's magnetic field) by the presence generally within the sensing area 16 of a ferromagnetic object or objects (not shown). As used herein, the term "ferromagnetic" refers to those metals, alloys, and compounds of the transition (iron group) rare-earth and actinide elements in which the internal magnetic moments spontaneously organize in a common direction, giving rise to a magnetic permeability considerably greater than that of vacuum and to magnetic hysteresis. Ferromagnetic materials may include, without limitation, iron, nickel, cobalt, and various alloys thereof.

The sensor array 40 may take on any of a wide range of configurations depending on the desired sensitivity and detection characteristics of the detector apparatus 10 as well as on the type of installation. For example, in the embodiment shown in FIGS. 1 and 2 the magnetometers 12 comprising the sensor array 40 may be arranged in spaced-apart relation so that they form two rows, a first row 22 and a second row 24. Each magnetometer 12 in each row, e.g., 22, 24, may be generally evenly spaced from its neighbor, while the rows 22, 24 themselves may be arranged so that the magnetometers 12 are positioned in generally aligned, but opposed, spaced-apart relation on either side of the sensing area 16. See FIG. 1. Each magnetometer 12 in the array 40 may be electrically connected to a suitable power supply 46 and to the signal processing system 14 via any convenient means, such as copper wire, etc. (not shown).

Figure 2:
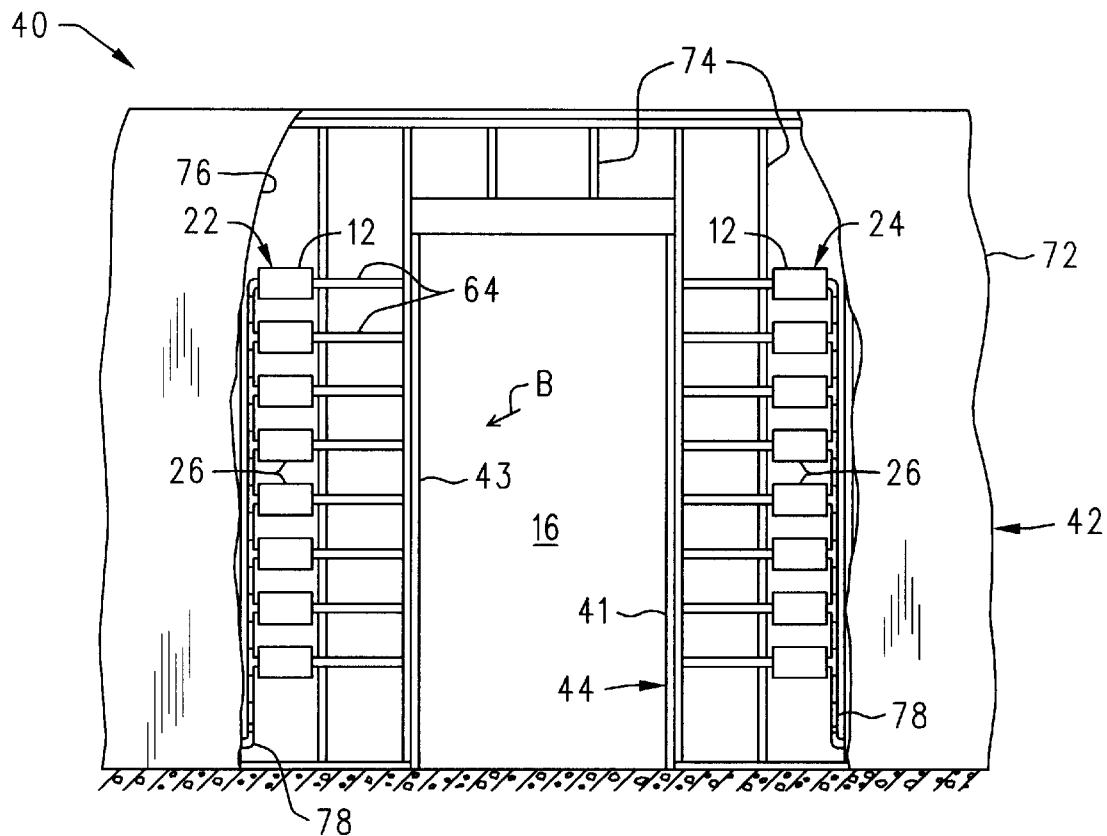
FIG. 2 is a front view in elevation of a doorway sensor array with a portion of the wall covering removed to show the position and orientation of the two rows of magnetic sensors positioned on either side of the doorway.

The arrangement of the two rows 22, 24 of magnetometers 12 is such that a sensing area 16 is defined generally between the rows 22, 24 of magnetometers 12, as best seen in FIGS. 1 and 2. A ferromagnetic object (not shown) having sufficient mass and located within the sensing area 16 will create a disturbance in the ambient magnetic field B that may be detected by one or more of the magnetometers 12. As will be described in greater detail below, the ability to detect disturbances in the magnetic field B caused by the presence of ferromagnetic material (not shown) within the sensing area 16 depends to a large extent on the type and sensitivity of the magnetometers 12 as well as on the spacing between the magnetometers, both within a given row, e.g., row 22, and between the rows 22, 24, themselves.

For example, the sensor array 40 shown in FIGS. 1 and 2 comprises two rows 22, 24 of magnetometers 12 and provides generally superior detection capability and sensitivity compared with the sensor array 240 shown in FIG. 10 that comprises only a single row 222 of magnetometers 212. Specifically, the sensor array 240 suffers from generally decreased sensitivity with regard to ferromagnetic objects that may be located at the extreme right-hand side 241 of the doorway 242, since all of the detectors 212 are located on the left side 243 of doorway 242.

Figure 3:
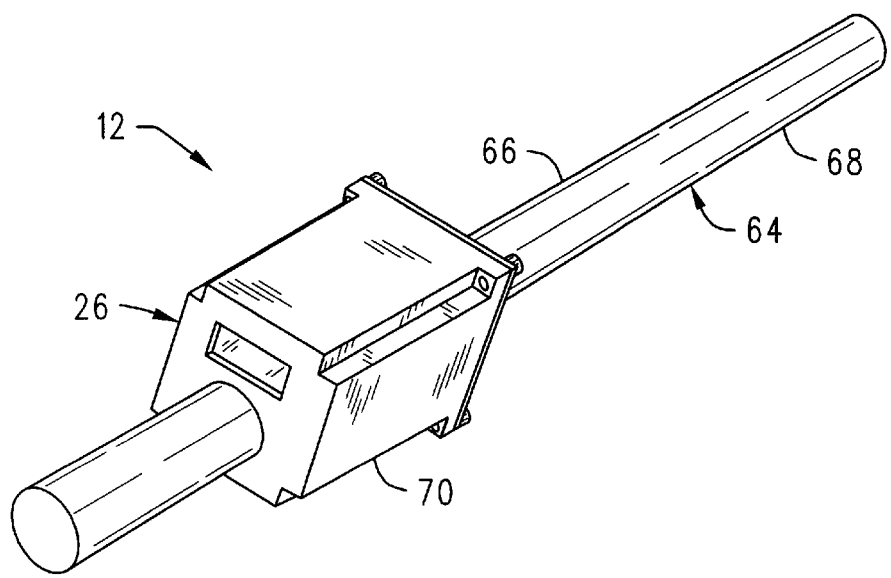
FIG. 3 is a perspective view of a fluxgate magnetic gradiometer that may be used with the present invention to sense magnetic field gradients.

The magnetometers 12 may comprise any of a wide range of devices capable of detecting magnetic fields, such as, for example, cesium vapor and proton precession magnetometers. However, in one preferred embodiment each magnetometer 12 comprises a fluxgate gradiometer 26, as best seen in FIG. 3. Essentially, a fluxgate gradiometer is a type of magnetometer that is sensitive to changes in the gradient of a magnetic field B. As used herein, the term "gradient" defines a vector quantity obtained from the magnetic field B whose components are the partial derivatives of B such that the gradient of the magnetic field B is the maximum rate of change of B in a given direction.

Still referring to FIG. 3, each fluxgate gradiometer 26 may comprise two separate fluxgate magnetometers (not shown) mounted within the sensing rod 64 at opposite ends 66, 68 thereof. Each fluxgate magnetometer (not shown) is connected to a suitable electronic control system (not shown) contained within the housing 70. Since the two fluxgate magnetometers (not shown) are positioned in spaced-apart relation within the sensing rod 64 (i.e., at or near the opposite ends 66, 68 of the sensing rod 64) the gradient of the magnetic field B along the direction of the rod 64 may be determined by comparing the signals from the two magnetometers. The electronic control system (not shown) contained within the housing 70 compares the signals from the two magnetometers and produces the output signal 18 that is related to the gradient of the detected magnetic field B.

As mentioned above, each fluxgate gradiometer 26 of the type shown in FIG. 3 is generally sensitive to changes in the magnetic field gradient in the direction of orientation of the sensing rod 64. Accordingly, for the case where the fluxgate gradiometers 26 are mounted so that their respective sensing rods 64 are oriented horizontally, (e.g., FIGS. 1, 2, 9, and 10) the gradiometers 26 are sensitive to variations in the horizontal gradient of the magnetic field B. If, on the other hand, the gradiometers 26 are mounted so that their respective sensing rods are oriented vertically (e.g., FIG. 11), then the gradiometers will be sensitive to variations in the vertical gradient of the magnetic field B.

In one preferred embodiment, each fluxgate gradiometer 26 may comprise a Model No. GA-72Cd fluxgate gradiometer manufactured by the Schonstedt Company of Reston, VA, although other brands and/or types of magnetometers may be used without departing from the scope of the present invention.

In one embodiment, the sensor array 40 may be concealed within a doorway 42. Referring now to FIG. 2, the concealed array 40 may comprise a plurality of magnetic sensors or magnetometers 12 mounted on either side of the opening 44 of the doorway 42. The sensors 12 may be mounted by any convenient means so that they are arranged in a first generally vertically oriented row 22 and a second generally vertically oriented row 24 on either side of the opening 44 of doorway 42. The two rows 22, 24 of magnetometers 12 therefore define a sensing area 16 that is generally contained within the opening 44 of doorway 42. So arranged, the magnetometers 12 are capable of detecting changes in the horizontal gradient of the ambient magnetic field B caused by the presence generally within the sensing area 16 of a ferromagnetic object or objects (not shown). The magnetometers or sensors 12 used in the concealed sensor array 40 may comprise fluxgate gradiometers 26, as best seen in FIG. 3 and as described above.

Since the sensors 12 are sensitive to magnetic disturbances caused by the presence of ferromagnetic materials, the doorway 42 and surrounding materials should be made from non-ferromagnetic materials, e.g., wood, aluminum, etc., so as not to adversely affect the sensitivity and performance of the detection apparatus 10. For example, in the embodiment shown in FIG. 2, the sensor array 40 may be integrated into a conventional wood-framed wall section 72 comprising a plurality of 2x 4 wooden studs 74 covered with a conventional wall material 76, such as "dry wall" or "gypsum board." The various components of the wall section 72 within the immediate vicinity of the magnetometers 12 should be constructed from non-ferromagnetic materials and fasteners, such as, for example, aluminum or brass nails and/or wood dowel pins. The power supply and output signal wires may be routed to the magnetometers 12 within a conduit 78 made from a non-ferromagnetic material, such as aluminum or plastic.

While any number of magnetometers 12 may be incorporated into the sensor array 40 integrated within the doorway 42, in one preferred embodiment the concealed sensor array 40 comprises eight (8) fluxgate gradiometers 26 per row 22, 24 for a total of sixteen (16) gradiometers 26. Assuming the doorway 42 is of standard height (i.e., 80 inches) and width (i.e., 30–36 inches), the vertical distance separating each gradiometer 26 in each row may be about eight to ten (8–10) inches. Likewise, the horizontal distance between the two rows 22, 24 may be in the range of about 3–4 feet or so.

As was briefly mentioned above, the sensor array 40 comprising two rows 22, 24 of magnetometers 12 (FIGS. 1 and 2) generally provides superior detection capability due to the fact that the rows 22, 24 are positioned adjacent the right-hand and left-hand sides 41, 43 of the doorway 42. Accordingly, the sensor array 40 will be more likely to detect the presence of a ferromagnetic object even though it may be located at or near the extreme right-hand or left-hand sides 41, 43.

The signal processing system 14 may be located at a remote location from the concealed sensor array 40 thereby allowing for the discrete scanning of persons passing through the doorway 42. Alternatively, however, the signal processing system 14 and/or associated display 20 may be located in plain view adjacent the doorway 42 if so desired. In still another embodiment, the signal processing system 14 may be located in the general area of the sensor array 40 and may be connected to a remote computer and display system (not shown) via an Ethernet or similar data link. In such an embodiment, the data from the sensors 12 may be collected and processed by the signal processing system 14 according to the processes described below. Then, the processed data may be sent to the remote computer and display system (not shown) over the data link.

Regardless of the particular location of the signal processing system 14 (i.e., adjacent to or remote from the sensor array 40), the signal processing system 14 collects the output data signals 18 from the sensor array 40, analyzes the data and presents them in a human readable form on the display 20, as was briefly described above. The attendant (not shown) may then evaluate the need to take further security measures.

Referring back again to FIG. 1, the signal processing system 14 may, in one preferred embodiment, comprise a buffer system 28, a filter system 29, a data acquisition system (DAS) 30, and a computer system 32. The computer system 32 may also include a memory system 34 and a display system 20. The buffer system 28 is connected between the sensors 12 and the DAS 30. The buffer system 28 receives the output signals 18 from the sensors 12 and produces output signals 36 for the DAS 30 which are essentially equivalent to the output signals 18 (i.e., the signals contain the same basic information relating to the magnetic field B). The buffer system 28 essentially acts as an impedance matching device to more closely match the output impedance characteristics of the magnetometers 12 with the input impedance characteristics of the data acquisition system 30 to ensure accurate response. Accordingly, a buffer system, such as buffer 28, may or may not be required depending on the particular type of magnetometers 12 and data acquisition system 30 used in a specific application.

In one preferred embodiment, the buffer system 28 includes an electronic filter circuit 29 to remove periodic noise signals created by a.c. power systems that may be in close proximity to the system 10. For example, a prominent source of magnetic "noise" in commercial buildings results from the large number of a.c. powered electrical equipment and devices that are usually associated with such buildings. The a.c. current used by such equipment and devices usually induces (i.e., creates) ambient magnetic fields that fluctuate at the same frequency as the a.c. current (e.g., 50 or 60 Hz). Since the strength of such induced magnetic fields may be of the same order of magnitude as the magnetic field being sensed by the magnetometers 12, it is important to minimize the effect of such induced magnetic fields.

One method for reducing the effects of such induced magnetic fields is to utilize a filter 29. Essentially, the filter 29 may comprise a notch filter (band rejection filter) that blocks signals having the same frequency as the associated a.c. power systems (e.g., 50 or 60 Hz). However, since such notch or band rejection filters are well-known in the art and could be easily provided by persons having ordinary skill in the art, the details of the particular notch filter 29 incorporated into the buffer system 28 will not be described further.

The data acquisition system (DAS) 30 performs a data collection or scanning function by scanning the analog output signals 36 from the buffer 28, which are essentially identical to the output signals 18 from the various sensors 12. The data acquisition system (DAS) 30 then converts the scanned analog signals 36 into digital signals 38 suitable for processing by the computer system 32. In one preferred embodiment, the data acquisition system 30 scans all of the sensors 12 in the array 40 nearly simultaneously, so that the scanned data essentially represents a single "snap shot" of the magnetic field characteristics at a particular instant. The entire array 40 is then scanned at a lower frequency to determine changes in the magnetic field over time. While many different sampling rates may be used, in one preferred embodiment, each magnetometer 12 in the array is sampled at a frequency of about 100 kHz. This high sampling frequency ensures that the time period between the sampling of two sensors is very short, in this case about 10 μsec. Therefore, an array 40 containing 16 sensors can be sampled in about 160 μsec. The frequency at which the entire array 40 is sampled is considerably lower, being about 1 kHz. That is, the entire array 40 is sampled about 1000 times per second.

The buffer system 28 and data acquisition system 30 may comprise any of a wide-variety of systems suitable for performing the functions of each respective device, and the present invention should not be regarded as limited to any particular device or system. However, by way of example, the buffer system 28 used in one preferred embodiment may comprise a plurality of high impedance buffer cards manufactured by IOtech, Inc., of Cleveland, Ohio 44146 and identified as model no. DBK-8. Since each buffer card only accommodates 8 channels, a sufficient number of cards must be provided to accommodate at least the number of sensors 12 (thus data channels) being used for a specific installation. The data acquisition system 30 used in one preferred embodiment may comprise a model no. DAQbook 216 also manufactured by IOtech, Inc., of Cleveland, Ohio. The basic DAQbook 216 comprises a single analog-to-digital (A/D) converter with a standard configuration of 16 data channels. Each data channel is accessed by a high speed multiplexer (not shown). The number of data channels can be expanded up to 256 channels, which would be sufficient to allow several separate sensor arrays, e.g., sensor array 40, to be connected to a single data acquisition system 30.

As was described above, the data acquisition system (DAS) 30 performs the scanning function required to collect or sample the analog output signals 36 (i.e., output signals 18) received from the array 40 of magnetometers 12. While any of a wide range of sampling frequencies may be used, it may be desirable to implement an "over-sampling" process to minimize the effect of periodic magnetic field fluctuations, such as those caused by a.c. power systems. The use of such an "over-sampling" process is particularly advantageous if a separate notch filter 29 is not used. However, such an "over-sampling" process may be used even if the system utilizes a separate notch filter 29.

The "over-sampling" technique or process utilized in the present invention provides another method for reducing the effects of periodic magnetic field fluctuations, such as those induced by a.c. power systems. The "over-sampling" process works by collecting or sampling the output signals 18 in such a way so that they include several different data points, preferably over several periods of the known alternating cycle. The data points collected by the "oversampling" process are then averaged to produce a mean data point representative of the sampled magnetic field.

By way of example, in one preferred embodiment of the detection system 10 that operates in buildings containing 60 Hz alternating current, the entire array 40 is sampled at a frequency of about 1000 Hz, i.e., once every millisecond (msec). This sampling frequency effectively provides 17 samples per sensor 12 per 60 Hz a.c. cycle. While this may be a sufficient number of samples for some applications, it is preferable to collect samples over several a.c. cycles. A "sample group" as used herein refers to the number of data points collected over a predetermined number of a.c. cycles. We have discovered that sampling the data over at least three (3) a.c. cycles provides good results. Therefore, in one embodiment, the sample group for each sensor comprises fifty-one (51) samples or data points, which corresponds to a time interval of about 50 msec or about 360 Hz cycles. The data points for each sample group are then added together and the sum divided by the total number of samples in the sample group to yield an average value for that particular sample group for the corresponding sensor or magnetometer 12.

It should be understood that the particular number of samples per sample group is not particularly critical, and a sample group could comprise any of a wide range of individual samples (i.e., data points), as would be obvious to persons having ordinary skill in the art. Therefore, the present invention should not be regarded as limited to only those configurations comprising 51 samples per sample group.

The computer system 32 may comprise a general purpose programmable computer suitable for controlling the data acquisition system 30 and for performing the necessary data processing steps at a speed sufficient to provide the desired degree of performance. In one preferred embodiment, the computer system 32 may comprise a standard computer card or board (e.g., a standard PC-104 form factor card), of the type that are readily available and commonly used in industrial applications. In another embodiment, the computer system 32 may comprise a personal computer (PC) (e.g., a "notebook" or "desk top" computer) of the type that is readily commercially available. The computer system 32 may be mounted in any convenient housing or structure (not shown) and may be located with the sensor array 40. Alternatively, the computer system 32 may be located at a remote position from the sensor array 40. If the computer system 32 is located with the sensor array 40 and a remote display is desired, then the computer system 32 may be connected to a suitable remote computer and display system (not shown) via a suitable data link (e.g., Ethernet).

The computer system 32 may be programmed to operate the data acquisition system 30 and to process and display the collected data in a human-readable form on the display device 20. The display device 20 may comprise a CRT or LCD display. The program may be written in any of a number of languages (e.g., C++) and/or with any number of programming aids or virtual instruments (e.g., Labview® for Windows®) suitable for the intended application.

Figure 5:
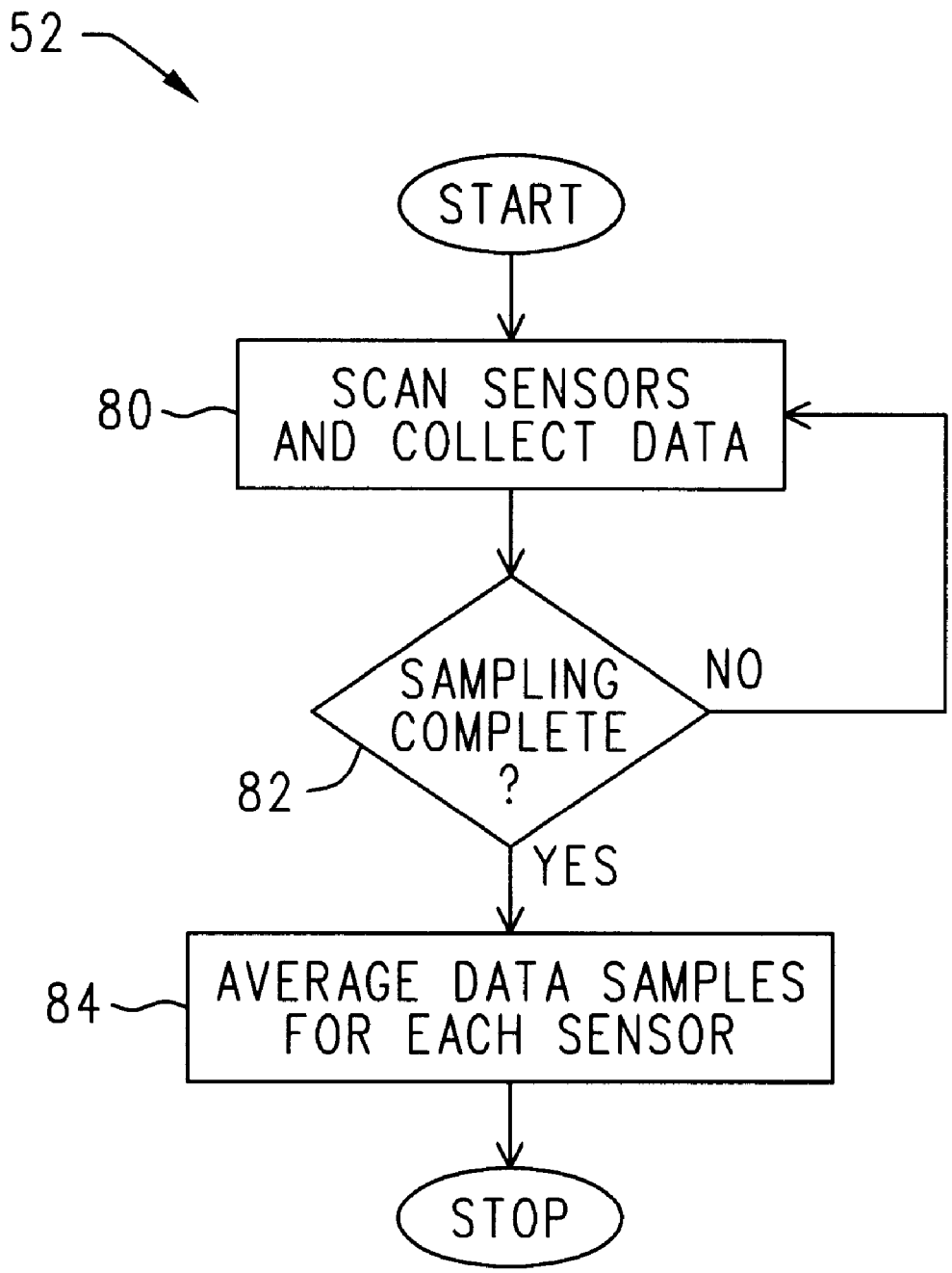
FIG. 5 is a flow diagram showing the details of the sample and average sensor data step shown in FIG. 4.

The details of the data collection and classification process 48 performed by the computer system 32 are best seen in FIGS. 4 and 5. The first step in the process 48 is step 50 wherein the computer system 32 continually checks to determine whether it is operating in a "stand-by" mode or a "data collection" mode. If the system 14 is operating in the "stand-by" mode, then no data are collected and the computer system 32 awaits a command instructing it to enter the "data collection" mode. Once the computer system 32 is instructed to collect data from the sensors or magnetometers 12, the process proceeds to step 52. In one embodiment, the selection of the mode of operation of the computer system 32 may be accomplished by programming the computer system 32 to display a message on the display system 20 instructing the attendant (not shown) to press a key or "click" an icon to switch the computer system 32 between the "stand-by" mode and the "data collection" mode. However, since such processes for initiating program sequences in response to user commands are well-known and would be obvious to persons having ordinary skill in the art, the particular program sequence for selecting between the "stand-by" mode and "data collection" mode will not be described in further detail.

Step 52 "sample and average sensor data" comprises a plurality of steps as set forth in FIG. 5. Basically, step 52 initiates the data collection (i.e., sampling) process by the data acquisition system 30. Referring now to FIG. 5, the first step 80 in the process 52 is to scan the sensors 12 and collect data from the output signals 18 received from the sensors 12. If a buffer system 28 is required, then the data acquisition system will sample the analog signals 36 received from the buffer 28. See FIG. 1.

As was described above, a number of samples or "snap shots" are taken from each sensor 12, with each sample representing the magnetic field gradient at a particular moment in time. For example, in one preferred embodiment, the various sensors 12 in the array 40 are sampled nearly simultaneously, e.g., at a frequency of about 100 kHz (i.e., about 10 $\mu$sec time between each sensor). The entire array 40 is then sampled at a frequency of about 1000 Hz or about once every msec. If the "over-sampling" process is used, then a sufficient number of samples will be collected so that the samples span a desired number of a.c. cycles. In one preferred embodiment, 51 samples will be collected for each sensor 12 (i.e., a sample group). That is, the sample group for each sensor 12 will encompass a time period extending over about three (3) 60 Hz a.c. cycles (i.e., 50 msec).

Once the required number of data samples (i.e., a sample group) have been collected for each magnetometer 12, as determined during step 82, the data from each sample group are then summed and averaged in step 84. The averaging process effectively removes the fluctuations resulting from the periodic magnetic noise generated by the use of a.c. power systems, which may be desirable if the system 10 is not provided with a separate noise filter 29, as described above. In one preferred embodiment, the arithmetic sum of the data samples in each sample group is divided by the total number of samples to yield the average for that sample group. However, other averaging techniques are known and could be readily substituted for the simple mathematical averaging technique just described. Consequently, the present invention should not be regarded as limited to any particular averaging technique. The program flow then returns to step 54. See FIG. 4.

Once the program flow reaches step 54, the system 14 may be operated in one of two user-selectable "data collection" modes: A "collect baseline data" mode or a "collect surveillance data" mode. Step 54 monitors the appropriate input device (e.g., keyboard) associated with the computer system 32 and awaits a command to enter the appropriate mode, which may be implemented in the manner already described, i.e., by keyboard entry or icon "click."

If the detection apparatus 10 is being operated for the first time or if it is being operated at a new site or position, it will usually be desirable to first operate the system 10 in the "baseline data collection" mode in which data are collected from the magnetometers 12, averaged, and stored as "baseline data" in step 56. However, in one preferred embodiment, the detection apparatus 10 is operated in the "baseline data collection" mode on a regular basis (e.g., about once every 10 minutes or so, although other time intervals could also be used) to ensure that the "baseline data" are representative of the current ambient magnetic field B.

Regardless of when the detection apparatus 10 is operated in the "baseline data collection" mode, the collected "baseline data" are representative of the characteristics of the ambient or background magnetic field, which may contain anomalies resulting from the presence of periodic magnetic field fluctuations resulting from nearby a.c. power transmission or devices. Such background anomalies may also be the result of relatively massive ferromagnetic materials located outside the sensing area 16. The collection of the "baseline data" therefore provides a basis for comparing magnetic anomalies that may be in the "surveillance data" against those magnetic anomalies that are always present.

Once the "background data" have been collected and stored, the program flow returns to step 50 and the metal detection apparatus 10 may be operated in the other "data collection" mode, i.e., the "surveillance data collection" mode (steps 54–62). In the "surveillance data collection" mode the output data signals 18 from the magnetometers 12 are periodically sampled by the data acquisition system 30 and fed into the computer system 32. These data are referred to as "surveillance data." The "surveillance data" are collected in exactly the same manner as the "background data," i.e., during step 52 (FIGS. 4 and 5). Therefore, the surveillance data collection process will not be described further.

Once the "surveillance data" have been collected, are processed by the computer system 32 to remove the background noise and, optionally, to determine whether any magnetic anomalies are present that may be indicative of the presence within the sensing area 16 of a ferromagnetic object or objects. These data are referred to herein as "classified data." As a first step 58 in processing the "surveillance data" to produce "classified data" the computer system 32 first subtracts the "baseline data" from the "surveillance data" to create "nulled" or "filtered surveillance data." The "nulled" or "filtered surveillance data" are free of those ambient magnetic anomalies that may be caused by materials and devices surrounding the particular installation, e.g., electrical equipment and/or massive ferromagnetic objects. Therefore, any magnetic anomalies remaining in the "nulled" or "filtered surveillance data" are likely the result of the presence of ferromagnetic objects within the actual sensing area 16.

Figure 8:
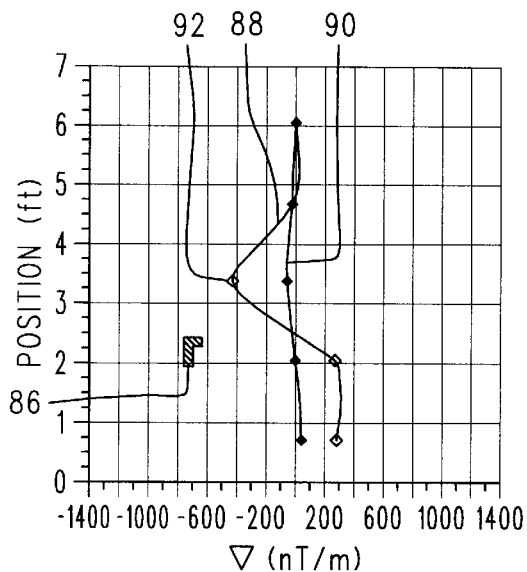
FIG. 8 is a pictorial representation of another embodiment of a display showing the approximate locations of ferromagnetic objects detected on a person within the sensing area.
Figure 8:
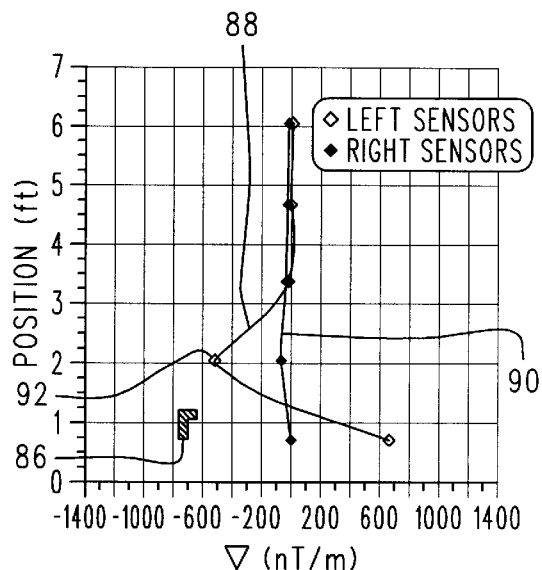
Figure 8:
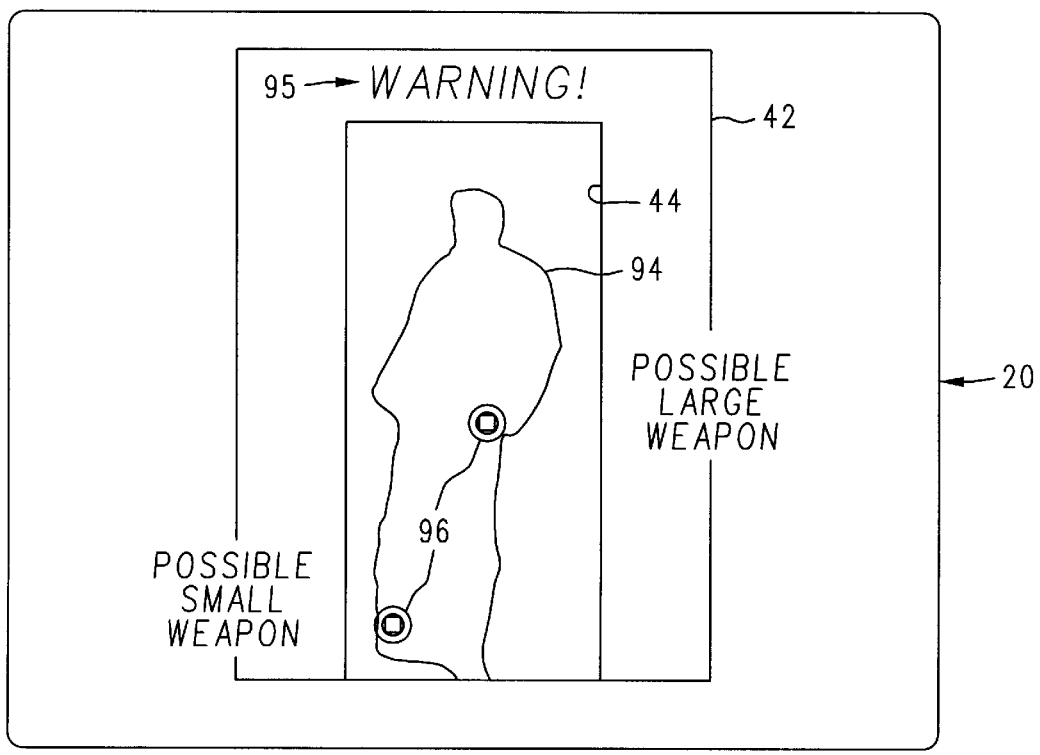
Figure 7A:
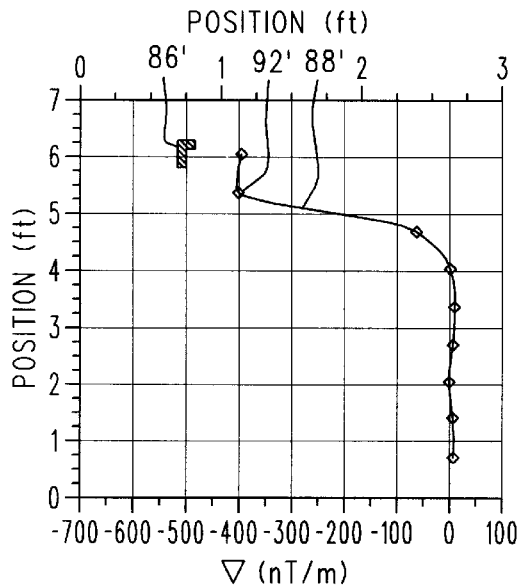
FIGS. 7A–F are graphical representations of magnetic field gradient vs. vertical position for an object having a monopole response characteristic.
Figure 7B:
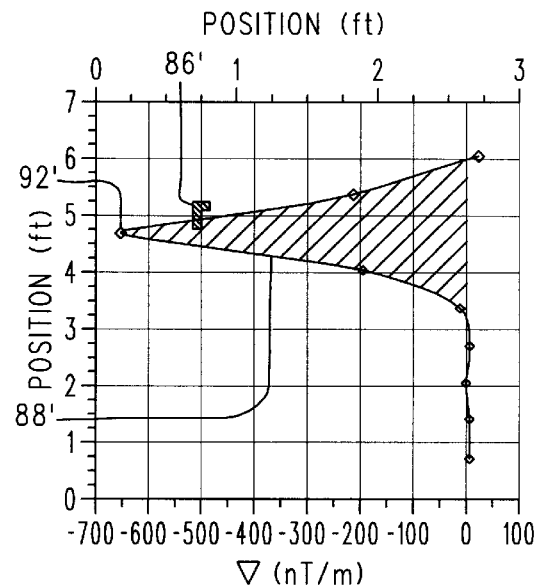
Figure 7C:
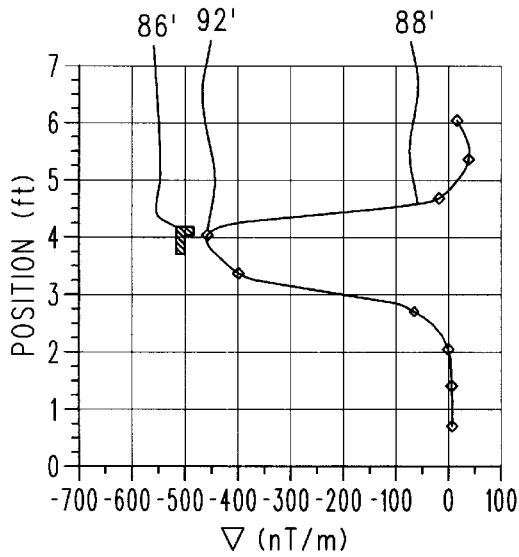
Figure 7D:
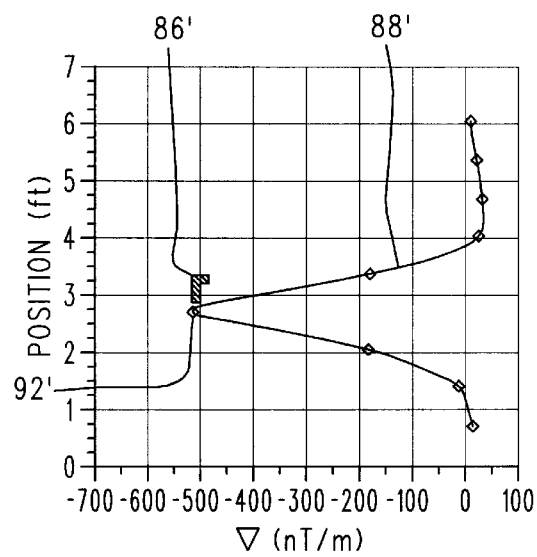
Figure 7E:
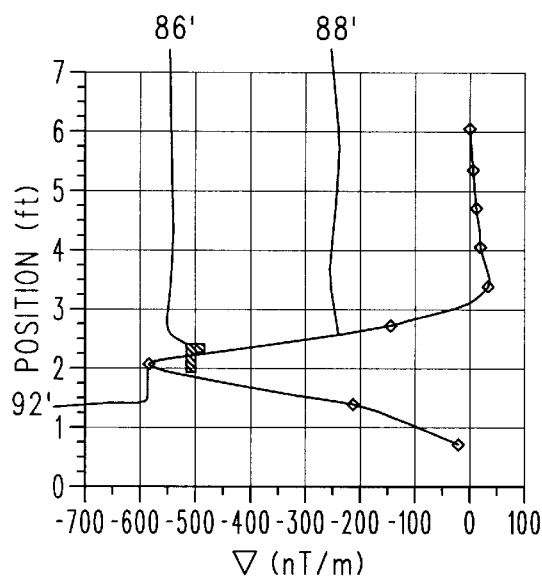
Figure 7F:
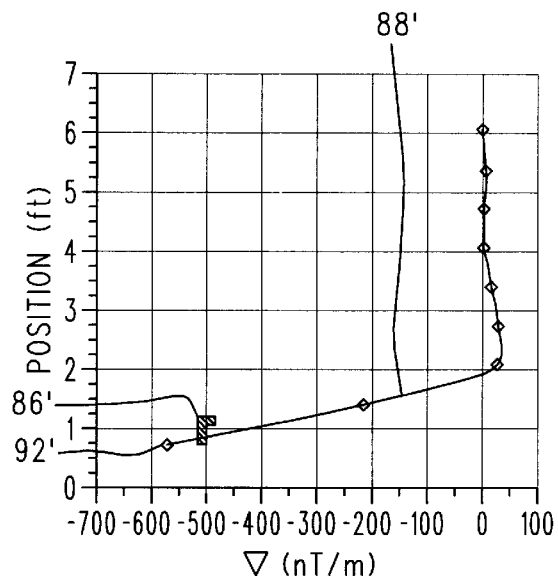

In one preferred embodiment, the "nulled" or "filtered surveillance data" are quantified and presented on the display device 20 as a two dimensional plot of magnetic field gradient ($\nabla$) vs. vertical position ($\nabla$) within the sensing area 16. See FIGS. 6A–F. Alternatively, the "filtered surveillance data" may be further processed to produce "classified data" which may then be presented on the display device 20 in a form substantially as shown in FIG. 8.

However, before proceeding with a detailed description of the various methods used to classify the "nulled" or "filtered surveillance data," it is important to recognize that the "filtered surveillance data" may be reflective of either a dipole response or a monopole response depending on the characteristics of the detected ferromagnetic object. The particular methods used to classify the surveillance data differ depending on whether a dipole response or a monopole response is detected.

A "dipole" response is shown in FIGS. 6A–F and may be produced by a relatively large or elongate ferromagnetic object. Briefly, such a dipole response results from the fact that the two magnetic poles (i.e., the north and south poles) induced in the object by the ambient magnetic field B are located relatively far apart, generally within the resolution of the sensor array 40. In contrast, a more compact, generally less elongate object will develop magnetic poles that are closer together, thus less readily resolved by the detector array 40. Such a response is referred to herein as a "monopole" response and is shown in FIGS. 7A–F. A detailed discussion of the two types of responses follows.

FIGS. 6A–F are indicative of a dipole response. In each figure, the magnetic field gradient $\nabla$ (in units of nanotesla/meter) is plotted along the lower abscissa 97 (the lower horizontal axis), while vertical position is plotted along the ordinate 98 (the vertical axis). Also, for the purpose of correlating the horizontal position of the sample ferromagnetic object 86 with respect to the two rows 22, 24 of sensors, the horizontal position of the object 86 may be plotted along the upper horizontal axis 99.

FIGS. 6A–F also show the magnetic field gradient $\nabla$ corresponding to several different vertical positions of a sample ferromagnetic object 86 producing a dipole response, in this case a Browning 9 mm semiautomatic pistol. Thus, in FIG. 6A the pistol 86 (represented schematically in FIGS. 6A–F) is located about 6 feet above the floor; in FIG. 6B, 5 feet above the floor, and so on through FIG. 6F, wherein the pistol 86 is located approximately 1 foot above the floor. In each case, the pistol 86 is located about 9 inches to the right of the left column 22 of sensors 12, as indicated by reference to the upper horizontal axis 99. Curve 88 represents the gradient $\nabla$ of the magnetic field B detected by the sensors 12 in row 22 (i.e., the left-hand sensors 12), whereas curve 90 represents the gradient detected by the sensors 12 in the right hand row 24 of sensors 12. See also FIGS. 1 and 2.

Figure 6A:
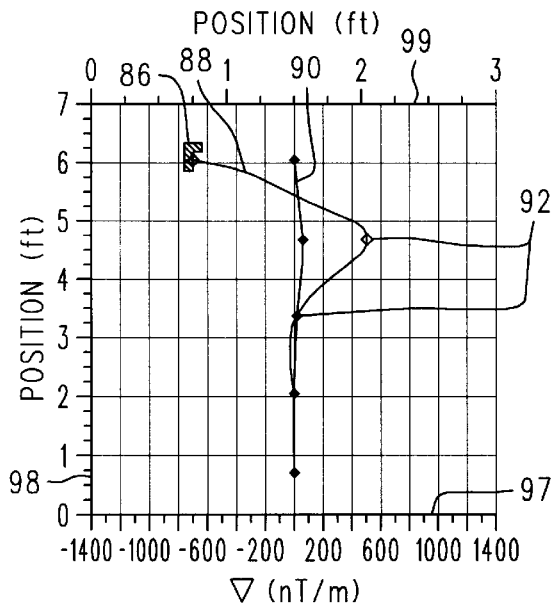
Figure 6B:
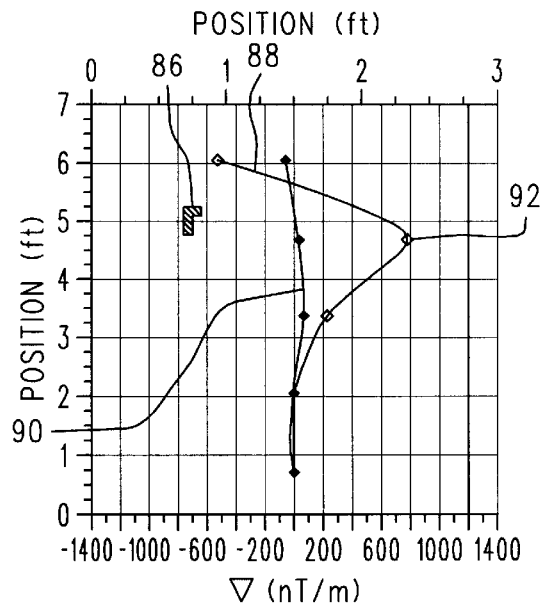
Figure 6C:
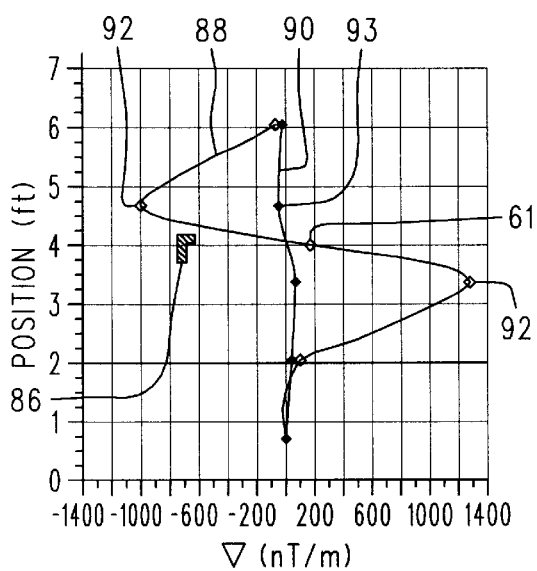
Figure 6D:
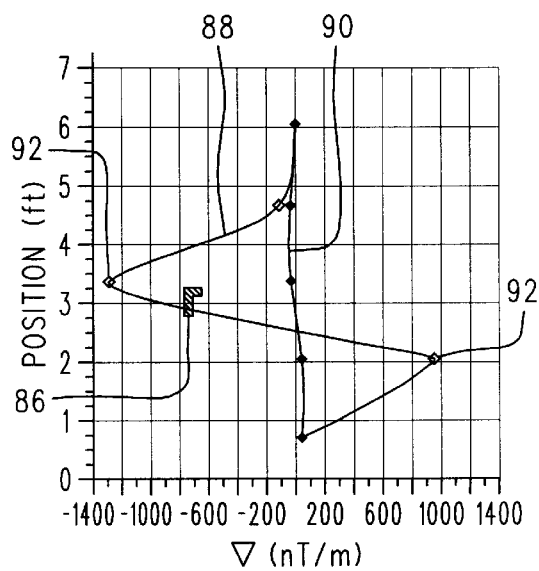

As can be seen from the curves 88, 90 in each of the FIGS. 6A–F, the presence of the pistol 86 in the sensing area 16 produces a significant change in the magnetic gradient $\nabla$. Since, in each case, the gun 86 is located nearer to the left-hand row 22 of sensors 12 than the right-hand row 24, the most significant change in the magnetic gradient $\nabla$ is detected by the left-hand row 22 of sensors 12 (i.e., curve 88), although there is some variation detected by the right-hand row of sensors 24 (i.e., curve 90). A significant feature of the magnetic gradient $\nabla$ (curves 88, 90) produced by an object having a dipole response characteristic is that the magnetic field gradient $\nabla$ changes sign (i.e., from a negative (−) gradient or value to a positive (+) gradient or value). Put in other words, each curve 88, 90 may include one or two relative maximum (i.e., positive magnetic gradient) and/or minimum (i.e., negative magnetic gradient) points, e.g., points 92, as well as an inflection point 61, as best seen in FIG. 6C.

Qualitatively, the curves 88, 90 and relative maximum and/or minimum points 92 are indicative of magnetic field anomalies that may be caused by the presence of ferromagnetic materials located within the sensing area 16, such as the pistol 86. Quantitatively, the curves 88, 90 and the points 92 may be evaluated by the data collection and classification program 48 to reach a determination as to the likelihood that the detected ferromagnetic material contains sufficient mass to warrant further investigation. Accordingly, the data collection and classification program 48 may include in the step 60 a classification process wherein the "filtered surveillance data" are classified to produce "classified data" indicative of the relative mass and/or location of the detected ferromagnetic object. The "classified data" would then be presented on the display device 20 as a plurality of highlights 96 indicating the relative mass and likely position of the detected ferromagnetic object.

For an object producing a dipole response characteristic, such as those shown in FIGS. 6A–F, the approximate vertical position of the ferromagnetic object, e.g., the pistol 86, may be inferred from the location of the inflection point 61. For example, referring to FIG. 6C, the corresponding vertical position of the inflection point 61 is approximately 4 feet above the floor, which corresponds to the approximate vertical position of the pistol 86. The location of the inflection point a 61 may be defined mathematically as that point where the partial second derivative of the vertical position V (ordinate 98) with respect to the magnetic field gradient $\nabla$ is zero. Stated mathematically, point 61 is defined as that point where:

$$\frac{\partial^2 \nabla}{\partial V^2} = 0$$

Therefore, the approximate vertical position of an object 86 exhibiting a dipole response may be determined by finding the vertical location that corresponds to the inflection point 61.

The approximate horizontal position of a ferromagnetic object (e.g., pistol 86) producing a dipole response characteristic may be inferred from the differences between the two curves at either the relative maximum or minimum points 92. For example, again referring to the example represented by FIG. 6C, the greater the difference of magnetic gradient $\nabla$ between the point 92 on curve 88 and a corresponding point 93 on curve 90, the closer the ferromagnetic object is located to the row of magnetometers represented by that curve, e.g., in this case the left-hand row 22. If, for example, the detected ferromagnetic object is located in the center of the doorway 42, substantially midway between the two rows 22, 24, then the difference between the magnetic gradient sensed by the two rows of sensors, will be rather small, close to zero. Similarly, if the object were positioned close to the right hand-row 24, then the curve 90 would contain the largest magnetic gradient variation, therefore indicating that the object is closer to the magnetometers 12 in the right-hand row 24.

The mass of the detected ferromagnetic object having a dipole response characteristic may be estimated by integrating the magnetic field gradient $\nabla$, i.e, by calculating the area bounded by the curves (e.g., 88, 90) and the vertical line corresponding to zero (0) magnetic gradient. For example, still referring to FIG. 6C, the "integrated magnetic density" obtained by integrating curve 88 corresponds to the areas bounded by the curve 88 and the zero point of the horizontal axis (i.e., zero magnetic gradient $\nabla$). Generally speaking, large integrated magnetic densities are indicative of large field gradients, which are in turn indicative of large (i.e., massive) ferromagnetic objects. Therefore, large integrated magnetic densities are generally indicative of relatively massive ferromagnetic objects.

Still other information about the object 86 may be gleaned from the "integrated magnetic density." For example, by comparing the "integrated magnetic density" obtained from both sets of sensors (i.e., curves 88 and 90), a determination (or verification) can be made as to the relative horizontal position of the object 86. That is, if the integrated magnetic density is large for the left-hand sensors and relatively small for the right hand sensors, then the object is located closer to the left-hand sensors. Similarly, if the integrated magnetic density values are approximately equal for both sets of sensors, then the object 86 is located near the mid-point between the two rows 22, 24 of sensors 12.

As was mentioned above, smaller, generally more compact ferromagnetic objects may produce a monopole response characteristic, as best seen in FIGS. 7A–F. If this type of monopole response is detected, then the system 14 classifies the "nulled" or "filtered surveillance data" as follows.

Referring now to FIGS. 7A–F, a relatively compact object, in this case a Walther PPK 9 mm semi-automatic pistol, produces a monopole response 88', i.e., a response wherein the magnetic gradient $\nabla$ generally does not change sign. For example, the magnetic gradient $\nabla$ shown in FIGS. 7A–F generally remains negative. However, the magnetic gradient could also be positive. Since the magnetic gradient $\nabla$ does not change sign, there is no inflection point, or if there is one, it is difficult to detect. Accordingly, the approximate vertical position of the object 86' is determined by locating a peak 92' on the monopole response curve 88'. The approximate horizontal position of the object 86' may be determined by evaluating the magnitude of the peak 92'. Alternatively, the horizontal position may be determined or confirmed by calculating the value of the integrated magnetic gradient (i.e., the shaded area between the curve 88' and the vertical line corresponding to zero magnetic gradient, FIG. 7B), as was the case for an object having a dipole response characteristic. The relative size (i.e., mass) of the ferromagnetic object may be determined by integrating the magnetic gradient $\nabla$, as was also described above.

After determining the approximate horizontal and vertical locations of the detected object or objects, as well as making some determination as to its mass (by integrating the magnetic gradient curve), the resulting data can then be presented on the display 20. Referring now to FIG. 8, one such display 20 could include a computer generated picture of a doorway 42 and associated opening 44. The computer system 32 could also generate a silhouette 94 of the person in the sensing area 16 with the probable locations and relative sizes of the detected ferromagnetic objects indicated by highlights 96. Alternatively the display may include a video "snap shot" of the doorway and person obtained from a video camera (not shown) associated with a video surveillance system (also not shown) and positioned to view the doorway.

The sensor array 40 may take on any of a wide variety of configurations depending on the desired application. For example, another embodiment of a sensor array 140 is shown in FIG. 9 as it could be configured table sensor array 140 is similar to the sensor array 40 shown in FIGS. 1 and 2 and could comprise two panels 122, 124, each of which contains a plurality of sensors or magnetometers 112, one of which is shown in FIG. 9. The magnetometers 112 are mounted within the panels 122, 124 in generally spaced-apart relation. Each panel 122, 124 is oriented so that the magnetometers 12 face one another in the manner shown in FIGS. 1 and 2. The panels 122, 124 may be fabricated from any of a wide variety of non-ferromagnetic materials, such as wood or aluminum, so as not to interfere with the detection capability of the sensors 112. A suitable conduit 178 may be provided as a convenient means for routing the various wires (not shown) required to connect the magnetometers 112 to the power supply (not shown) and signal processing system (also not shown) which may be located at a remote location. The power supply and signal processing system may be substantially identical to the power supply 46 and signal processing system 14 shown and described above.

Yet another embodiment 240 of the sensor array is shown in FIG. 10 as it could be incorporated into a doorway 242. This embodiment of the sensor array 240 differs from the first embodiment 40 shown in FIGS. 1 and 2 in that it comprises only a single row 222 of magnetometers 212. Each of the magnetometers 121 may be connected to a remotely located power supply and signal processing system (not shown) by a suitable conduit 278. As was the case for the sensor array 40, the doorway 242 housing the sensor array 240 should be constructed from non-ferromagnetic materials, such as wood or aluminum, for maximum sensitivity and effectiveness.

Generally speaking, the sensor array 240 is not as sensitive as the sensor arrays having two opposed rows of magnetometers, e.g., sensor arrays 40 and 140, particularly if the ferromagnetic object is located at the far end of the sensing area 216, e.g., near the right-hand side 241 of doorway 242. However, sensor array 240 has the advantage of requiring fewer magnetometers 12, and may be suitable in those instances involving relatively narrow doorways or in well-shielded environments wherein magnetic anomalies resulting from the presence of ferromagnetic materials would be easy to detect, even at the far right end of the sensing area 216.

Figure 11:
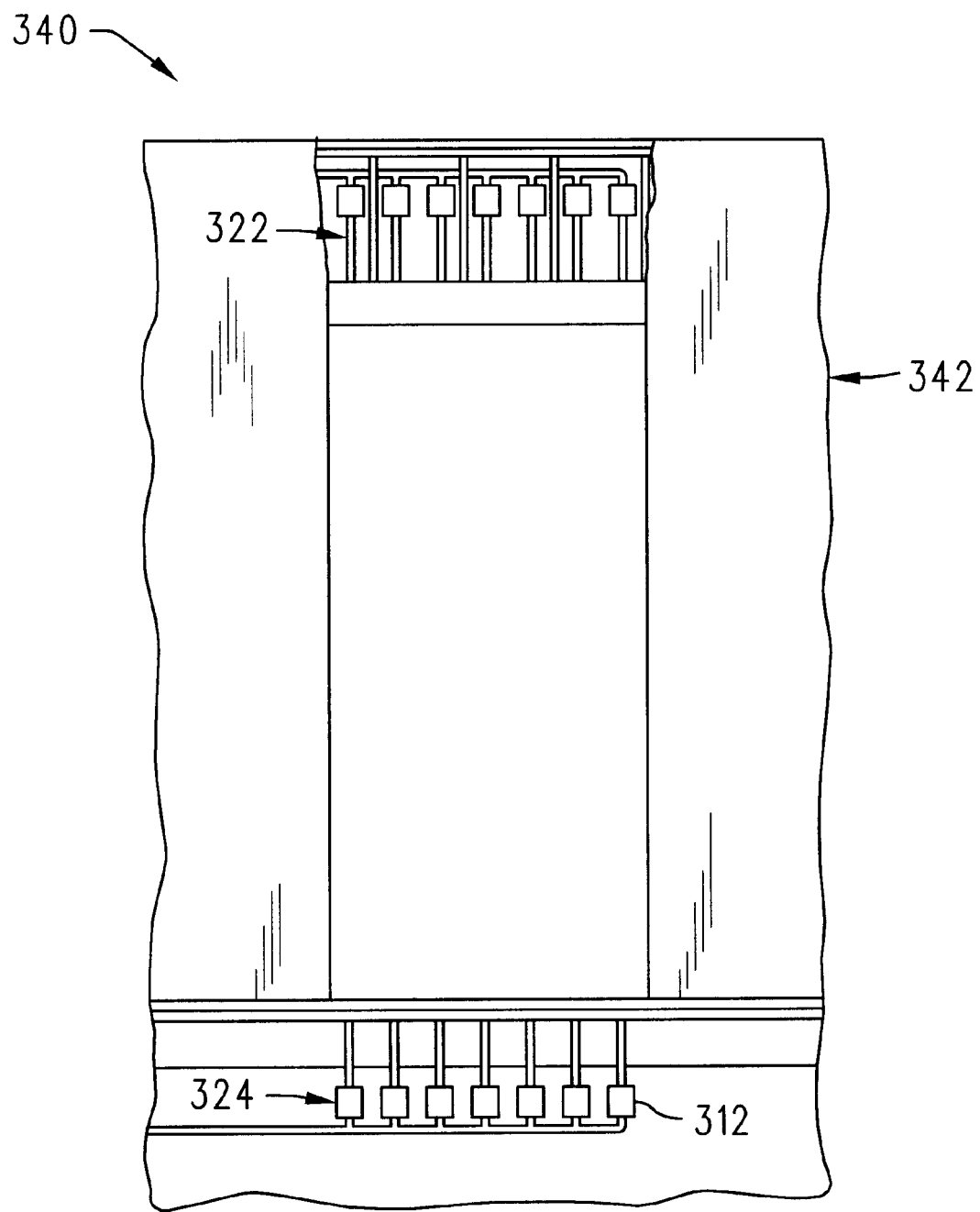
FIG. 11 is a front view in elevation of a yet another embodiment of a doorway sensor array comprising two rows of magnetic sensors arranged above and below the doorway.

Still other configurations for the sensor array are possible. For example, a sensor array 340 is shown in FIG. 11 as it could be incorporated into a doorway 342. As was the case for the first sensor array 40, the sensor array 340 comprises two rows 322, 324 of sensors 312, except that the rows 322, 324 are horizontally oriented to comprise an upper row 322 and a lower row 324. As was the case for the sensor arrays 40 and 240, the doorway 342 incorporating the sensor array 340 should be made from non-ferromagnetic materials.

Figure 12:
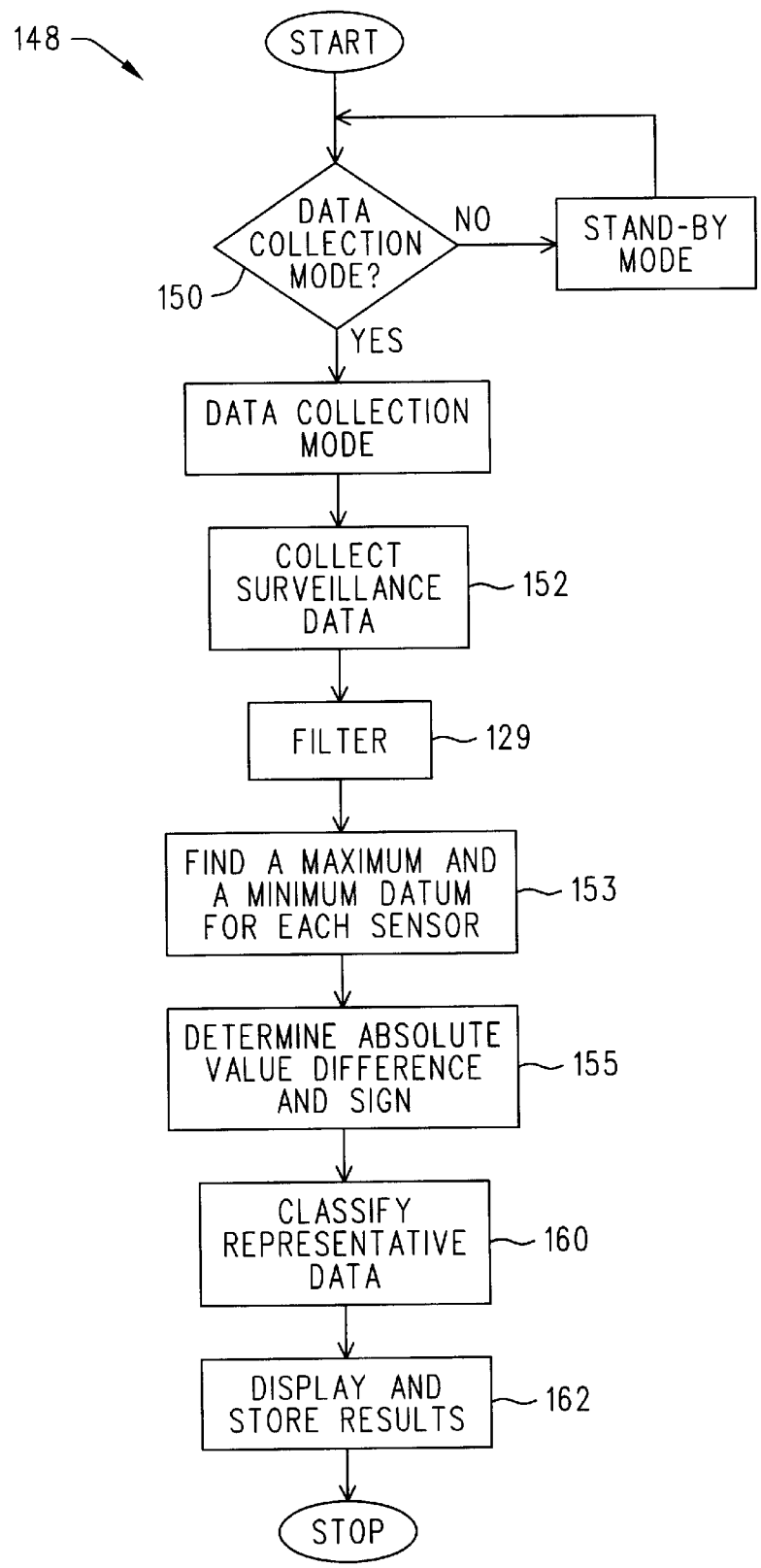
FIG. 12 is a flow diagram of a second embodiment of a data collection and classification process.

The various embodiments 10, 110, 210, and 310 of the advanced metal detection apparatus described above may be operated in accordance with a second embodiment of a data collection and classification process 148, as best seen in FIG. 12. The second embodiment of the data collection and classification process 148 differs from the first embodiment described above in that it does not require the collection of baseline data. The sampling algorithm also differs somewhat and the various magnetic field sensors (e.g., magnetometers 12) are sampled over a longer sample time than is the case for the first embodiment of the data collection and classification process 48. The second embodiment 148 of the data collection and classification process therefore dispenses with many of the processes required for the first embodiment 48 while generally providing for enhanced performance.

Referring now to FIG. 12 with occasional reference to FIG. 1, the first step in the process 148 is step 150 wherein the computer system (e.g., computer system 32) continually checks to determine whether it is operating in a "stand-by" mode or a "data collection" mode. If the system 14 is operating in the "stand-by" mode, then no data are collected and the computer system 32 awaits a command instructing it to enter the "data collection" mode. Once the computer system 32 is instructed to collect data from the magnetic field sensors or magnetometers 12, the process proceeds to step 152. The selection of the mode of operation of the computer system 32 may be accomplished by providing the sensor array 40 with device or system for determining when a person is about to pass through the sensor array. By way of example, in one preferred embodiment, the sensor array 40 may be provided with one or more photosensors (not shown) for detecting when a person is about to pass through the array and for generating a corresponding signal. Upon detection of the signal, the computer system 32 will switch from the "stand-by" mode to the "data collection" mode. Alternatively, other types of sensors or devices may be used to detect when a person is about to pass through the sensor array 40. However, since such devices for detecting when a person is about to enter an area are well-known in the art and could be readily provided by persons having ordinary skill in the art, the particular photosensor devices utilized in one preferred embodiment will not be described in further detail herein.

Step 152 "collect sensor data" differs from the step 52 described in the first embodiment. While step 152 initiates the data collection (i.e., sampling) process by the data acquisition system 30, the data are sampled over a much longer sample time and are not summed and averaged. By way of example, in one preferred embodiment, the various sensors 12 in the sensor array 40 are sampled nearly simultaneously, e.g., at a frequency of about 100 kHz (i.e., about 10 $\mu$sec time between each sensor). The entire array 40 is then sampled at a frequency of about 1 kHz (i.e., about once every millisecond) during a sample time of about 1 second. Consequently, the data acquisition system collects about 1000 data points per sensor 12 during the sample time. Recall that in the first embodiment, only about 51 samples were collected for each sensor 12.

It is generally preferred that the data signal from each sensor 12 be filtered to remove noise, particularly noise of a periodic nature. In one preferred embodiment, the data signals from the various sensors 12 may be filtered by a digital filter (not shown in FIG. 1, but functionally indicated by process step 129 in FIG. 12) to remove noise of a periodic nature (e.g., 50 or 60 Hz signals) which may be caused by the presence of a.c. power systems. The digital filter 129 should be located "downstream" of the analog-to-digital (A/D) converter (not shown) associated with the data acquisition system 30. By way of example, the digital filter 129 in one preferred embodiment is located between the data acquisition system 30 and the computer system 32. Digital filter 129 may comprise any of a wide range of digital filter systems well-known in the art and that are readily commercially available. Alternatively, the system may utilize an analog filter 29 shown in FIG. 1 and described above.

Once the surveillance data for each sensor 12 have been collected and filtered, the data collection and classification process 148 proceeds to step 153. In step 153, the computer system 32 scans the surveillance data collected for each sensor 12 to determine the location and magnitude of a maximum datum and a minimum datum. Generally speaking, the existence of maximum and minimum data are indicative of the presence of a ferromagnetic object within the sensing area 16. Put another way, if no ferromagnetic object is present within the sensing area 16, then the surveillance data may not contain such maximum or minimum data, i.e., the surveillance data may essentially comprise a "flat line" response characteristic.

The absolute value difference between any detected maximum and minimum is indicative of the magnitude of the magnetic gradient $\nabla$ induced by the presence of the ferromagnetic object within the sensing area. Consider, for example, the situation illustrated in FIG. 6A at data point 92 for the curve 88 which is indicative of the response of the left-hand sensor 12 located immediately below the top sensor (FIG. 6 represents the magnetic field data that may be collected by a sensor array having five (5) sensors located on each side of the sensing area 16). The absolute value difference determined from the surveillance data collected from the subject sensor (e.g., the sensor located immediately below the top sensor) is indicative of the magnitude of the magnetic field gradient ▽ (e.g., in the case illustrated in FIG. 6A, about 500 nT/m). What is not provided by the absolute value difference is the sign of the magnetic field gradient ▽ (i.e., whether point 92 is +500 nT/m or −500 nT/m). The sign (i.e., positive or negative) of the absolute value difference is determined from the order in which the maximum and minimum data points occur in the surveillance data corresponding to the subject sensor. Specifically, if the maximum datum occurs first, the absolute value difference is assigned a positive sign. Conversely, if the minimum datum occurs first, the absolute value difference is assigned a negative sign.

In accordance with the foregoing considerations, process 155 determines the absolute value difference between the maximum and minimum data as well as the sign of the absolute value difference. Together, the magnitude and sign of the absolute value difference are referred to herein as a "representative surveillance datum." In the example discussed in the preceding paragraph, the representative surveillance datum for the left-hand side sensor located immediately below the top sensor corresponds to the magnetic field gradient ▽ (e.g., point 92 on curve 88) detected by the subject sensor during the sample time.

After the representative surveillance datum (i.e., the absolute value difference and its corresponding sign) has been determined for each sensor, the representative surveillance data from all the sensors 12 may presented on the display device 20 at step 162 as a two dimensional plot of magnetic field gradient (▽) vs. vertical position (▽) within the sensing area 16, as best seen in FIGS. 6A–F. Alternatively, the representative surveillance data may be further processed to produce "classified data" at step 160 which may then be presented on the display device 20 in a form substantially as shown in FIG. 8 at step 162.

The method 160 used to classify the "representative surveillance data" may comprise the process 60 described above for the first embodiment of the data collection and classification process 48. That is, the classification process 160 may proceed to determine the approximate horizontal and vertical positions of the ferromagnetic object, as well as its approximate size (i.e., mass) based on whether the ferromagnetic object produces a dipole response characteristic (e.g., as shown in FIGS. 6A–F) or a monopole response characteristic (e.g., as shown in FIGS. 7A–F).

This completes the detailed description of the preferred embodiments of the advanced metal detection apparatus according to the present invention. While a number of specific components were described above for the preferred embodiments of this invention, persons skilled in this art will readily recognize that other substitute components or combinations of components may be available now or in the future to accomplish comparable functions to the apparatus described herein. Accordingly, it is contemplated that the inventive concepts herein described may be variously otherwise embodied and it is intended that the appended claims be construed to include alternative embodiments of the invention except insofar as limited by the prior art.

I claim:

1. A method for detecting a presence or an absence of a ferromagnetic object within a sensing area, comprising:

sensing, during a sample time, a magnetic field adjacent the sensing area;

producing surveillance data representative of the sensed magnetic field during the sample time;

determining an absolute value difference between a maximum datum and a minimum datum comprising the surveillance data; and determining whether the absolute value difference has a positive sign or a negative sign based upon a determined relative order of occurrence of the maximum datum and minimum datum, the absolute value difference between the maximum datum and the minimum datum and the corresponding positive or negative sign comprising a representative surveillance datum, the representative surveillance datum being indicative of the presence or absence of the ferromagnetic object within the sensing area.

2. The method of claim 1, further comprising filtering the surveillance data to remove noise before determining an absolute value difference between a maximum datum and a minium datum comprising the surveillance data.

3. A method for detecting a presence or an absence of a ferromagnetic object within a sensing area, comprising:

providing a first magnetic field sensor positioned at a first location adjacent the sensing area, the first magnetic field sensor producing first surveillance data representative of a first sensed magnetic field;

providing a second magnetic field sensor positioned at a second location adjacent the sensing area, the second magnetic field sensor producing second surveillance data representative of a second sensed magnetic field;

sensing, during a sample time, the first and second magnetic fields;

determining, for the first and second surveillance data, an absolute value difference between a maximum datum and a minimum datum; and determining whether the absolute value difference for the first and second surveillance data has a positive sign or a negative sign based upon a determined relative order of occurrence of the maximum datum and minimum datum, the absolute value differences and corresponding positive or negative signs comprising representative surveillance data, the representative surveillance data being indicative of the presence or absence of the ferromagnetic object within the sensing area.

4. The method of claim 3, further comprising filtering the surveillance data to remove noise before determining for each magnetic field sensor an absolute value difference between a maximum datum and a minium datum comprising the surveillance data.

5. The method of claim 3, further comprising the step of classifying the representative surveillance data to produce classified data indicative of a position of the ferromagnetic object within the sensing area.

6. The method of claim 5, wherein the step of classifying the representative surveillance data comprises determining whether the representative surveillance data are indicative of a dipole response.

7. The method of claim 6, further comprising determining an inflection point from the representative surveillance data, the inflection point being indicative of a vertical position of the ferromagnetic object within the sensing area.

8. The method of claim 6, further comprising determining a difference in a magnetic gradient between magnetic sensors located on opposite sides of the sensing area, the difference in the magnetic gradient being indicative of a horizontal position of the ferromagnetic object within the sensing area.

9. The method of claim 6, further comprising integrating a magnetic field gradient, the integrated magnetic field gradient being indicative of a mass of the ferromagnetic object within the sensing area.

10. The method of claim 5, wherein the step of classifying the representative surveillance data comprises determining whether the representative surveillance are indicative of a monopole response.

11. The method of claim 10, further comprising locating a peak in the representative surveillance data, the peak being indicative of a vertical position of the ferromagnetic object within the sensing area.

12. The method of claim 10, further comprising determining a magnitude of the peak, the magnitude of the peak being indicative of a horizontal position of the ferromagnetic object within the sensing area.

13. The method of claim 10, further comprising integrating a magnetic field gradient, the integrated magnetic field gradient being indicative of a mass of the ferromagnetic object located within the sensing area.

* * * * *